Sept. 12, 1944.    R. M. KISSINGER    2,358,075
TRAINING AID
Filed Sept. 7, 1943
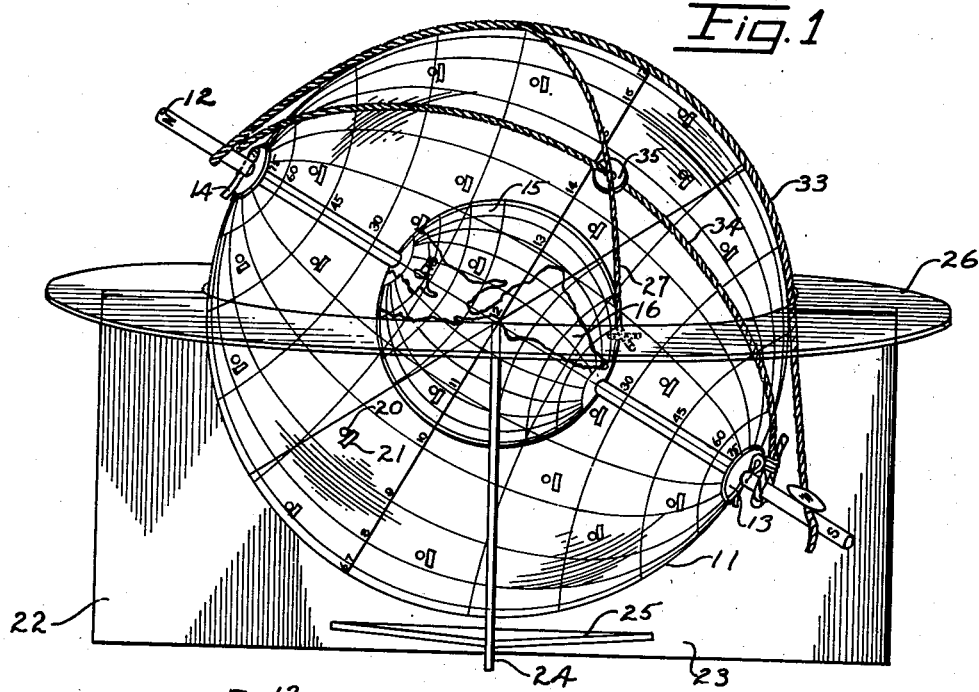
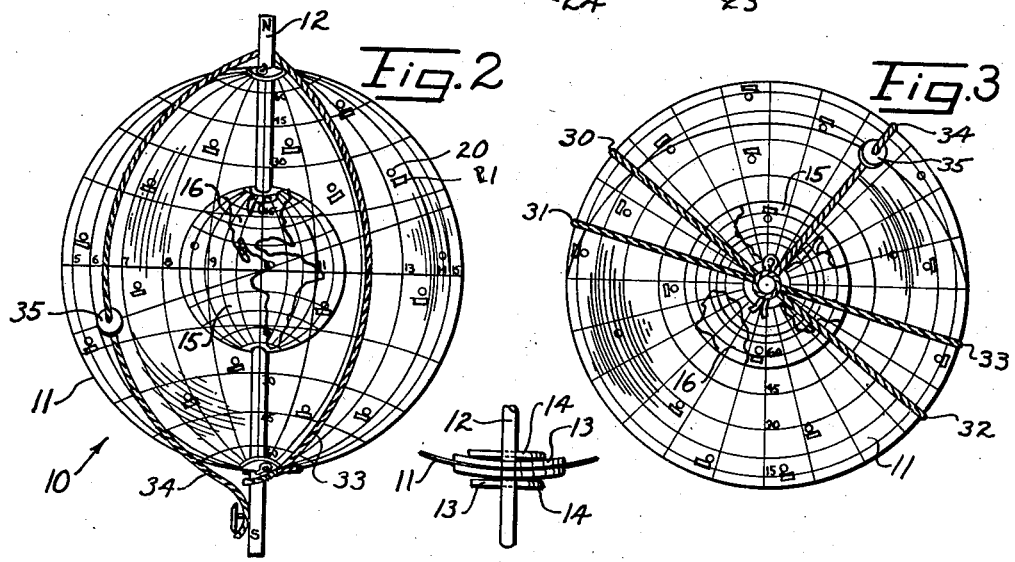
INVENTOR
ROSE M. KISSINGER
BY
ATTORNEY Patented Sept. 12, 1944

2,358,075

UNITED STATES PATENT OFFICE 2,358,075

TRAINING AID

Rose M. Kissinger, San Francisco, Calif.

Application September 7, 1943, Serial No. 501,486

6 Claims. (Cl. 35—47)

This invention relates to a celestial training aid and has for an object to provide a simplified device for visually representing the earth and its relation to the stars, which is particularly useful as an aid in teaching celestial navigation and nautical astronomy whereby a student may view the various aspects of the terrestrial and celestial spheres with their manifold lines, which lines students are required to imagine when learning and drawing the various celestial spherical projections.

Devices of this general nature have been known before, some of them being shown in U. S. Patents Nos. 320,999; 336,280; 1,189,141 and 2,055,148, but it is an object of this invention to provide a device which is simpler in construction and operation than the previously known devices and which can be manufactured and distributed at much less cost than it is possible to do with any other previously known device.

A further object of this invention is to provide a movable celestial sphere made of sturdy transparent plastic material within which there is a globular representation of the earth showing its apparent relationship to the stars, which stars are delineated on the surface of the transparent celestial sphere along with a number of other navigational data.

A further object of this invention is to provide a celestial sphere with a terrestrial globe therein mounted on a common pole extending through both globe and sphere to which are added a few cords and a horizon thereby enabling practically all navigational data to be represented and demonstrated to a student.

With the foregoing and other objects in view, the invention consists in the construction, combination and arrangement of parts hereinafter described and illustrated in the drawing, in which:

Fig. 1 is a perspective view of the navigation training aid of this invention mounted on a supporting base, Fig. 2 is a plan hemispherical view showing it on a plane parallel to the poles, Fig. 3 is a plan hemispherical view on a plane at right angles to Fig. 2 with some additional cords, and Fig. 4 is a detailed view showing how the pole is mounted in the celestial sphere.

There is shown at 10 the navigation training aid of this invention consisting of a plastic transparent celestial sphere 11 mounted on a pole 12, being held in position thereon by means of washer 13 and cotter pins 14. Mounted within this sphere 11 on the same pole 12 is a globe 15 of opaque material representing the earth. This globe 15 is fixably mounted on the pole 12 while the sphere 11 is rotatably mounted on the pole 12 thereby enabling the relative position of the surface of the globe 15 and the sphere 11 to be changed as desired.

The globe 15 is the usual terrestrial globe displaying a map 16 of the earth's surface with lines representing the meridians, the parallels of latitude, the equator, the ecliptic together with their usual data. The same data are represented on the celestial sphere 11, except that instead of the outlines of the earth's surface being shown, there are shown the relative positions of the more prominent visible stars 20, some fifty-five, more or less, together with their names at 21. The line data in the transparent plastic celestial sphere 11 are preferably in the form of colored threads embedded within the plastic, while the data concerning the stars are in the form of small labels pasted on the sphere. As a result, the line data are permanent on the sphere, but the data concerning the stars may be changed at will, enabling very few, or a great many, of the stars to be represented as desired by the teacher according to the progress of the students. The star labels will preferably be secured by a non-setting adhesive, such as that commercially known as "Scotch tape." The sphere, when in teaching position as shown in Fig. 1, rests on a base 22 which is easily collapsible for storage. This base 22 consists of two pieces of cardboard 23 and 24, one of which is slit from the bottom up and the other is slit from the top down so that they may be mounted at right angles to each other, while another slit parallel to their bottom edges receives a reinforcing piece 25 holding the cardboards 23 and 24 in proper angular relations to each other. Before being joined together, however, each of the cardboards 23 and 24 has a curved section cut out of its top edge corresponding in radius to the radius of the sphere 11, thus providing a hollow for receiving and supporting the sphere 11 in any angular position. An annular piece of transparent plastic 26 having in its inner radius about equal to the radius of the sphere 11 is used to represent a projection of the horizon and is held in position at any angle by means of a cord 27 secured across the annulus 26 of such length that when the cord 27 extends partly around the sphere 11 it holds annulus 26 in proper position.

In addition to the horizon supporting cord 27, a plurality of cords 30, 31, 32, 33 and 34, each preferably of different color, may be attached to the pole 12, being either tied thereto or secured temporarily as by a thumb tack. A disk 35 is passed over one of the cords and may be used to represent the position of the sun or one of the planets. Obviously, additional disks may similarly represent some of the various planets of the solar system.

In operation, this invention is not used for solving problems in navigation such as in some of the well known existing but complicated devices, some of which are shown in the patents mentioned above, but is used as a teaching aid for training novices in the elementary principles that he must learn before he can understand the problems in navigation that he will have to solve.

With the extremely simple arrangement of the terrestrial and celestial globes 15 and 11, without cords and horizon piece, the following can be demonstrated.

> Vernal equinox
> Equinoctial
> Ecliptic
> Circles of declination,
> Hours of right ascension,
> Right ascension of any indefinite number of stars,
> Declination of any indefinite number of stars,
> Celestial poles,
> Terrestial poles,
> Equinoxes,
> Solstices,
> Apparent daily movement of stars, to westward, and
> Revolution of circumpolar stars, Without the horizon piece, but with one cord, together with celestial indicator, in place over a given position of the sun there can be demonstrated the following, in addition to the above:

> Right ascension of the sun,
> Declination of the sun,
> Sun's apparent daily westward motion, and
> Sun's annual easterly motion on the ecliptic.

Without horizon piece, but with two cords in place, one over a local meridian and one over the Greenwich meridian there can be demonstrated the following in addition to the above:

> Longitude,
> Greenwich apparent time,
> Local apparent time,
> Greenwich hour angle of celestial bodies,
> Local hour angle of celestial bodies,
> Right ascension of celestial bodies,
> Greenwich sidereal time,
> Local sidereal time, and the
> Meridian angle $t$.

With the addition of the horizon and its cord representing the vertical, or altitude, circle in place there can be demonstrated the following, in addition to the above:

> Altitude,
> Zenith,
> Zenith distance, that is, the distance from the observed celestial body to the zenith,
> Latitude,
> Co-latitude,
> Declination, that is, the distance the sun is from the pole nearest to the observer,
> Polar distance,
> Meridian angle $t$, and
> Azimuth.

Other modifications and changes in the number and proportions of the parts may be made by those skilled in the art without departing from the nature of this invention within the scope of what is hereinafter claimed.

What is claimed is:

1. A celestial training aid comprising a pole, a terrestrial sphere fixedly mounted on the pole, a transparent celestial sphere rotatably mounted on said pole, said spheres being concentric, said pole thereby representing both celestial and both terrestrial poles, permanent means in said transparent celestial sphere representing right ascension and declination lines, means for removably representing star locations thereon, and cord means attachable to said pole for representing selected meridians.

2. A celestial training aid comprising a pole, a terrestrial sphere fixedly mounted on the pole, a transparent celestial sphere rotatably mounted on said pole, said spheres being concentric, said pole thereby representing both celestial and both terrestrial poles, permanent means in said transparent celestial sphere representing right ascension and declination lines, means for representing star locations thereon, cord means attachable to said pole for representing selected meridians, and a member slidable on one cord representing a movable celestial body.

3. A celestial training aid comprising a pole, a terrestrial sphere fixedly mounted on the pole, a transparent celestial sphere rotatably mounted on said pole, said spheres being concentric, said pole thereby representing both celestial and both terrestrial poles, permanent means in said transparent celestial sphere representing right ascension and declination lines, means for representing star locations thereon, cord means attachable to said pole for representing selected meridians, a member slidable on one cord representing a movable celestial body, a transparent horizon annulus, and means for mounting said horizon annulus on said celestial sphere.

4. A celestial training aid comprising a pole, a terrestrial sphere fixedly mounted on the pole, a transparent celestial sphere rotatably mounted on said pole, said spheres being concentric, said pole thereby representing both celestial and both terrestrial poles, permanent means in said transparent celestial sphere representing right ascension and declination lines, means for representing star locations thereon, cord means attachable to said pole for representing selected meridians, a member slidable on one cord representing a movable celestial body, a transparent horizon annulus, and means for mounting said horizon annulus on said celestial sphere, said annulus mounting means comprising a cord secured to said annulus, said annulus mounting cord cooperating with selected meridian cords to form an astronomical triangle.

5. A celestial training aid comprising a pole, a terrestrial sphere fixedly mounted on the pole, a transparent celestial sphere rotatably mounted on said pole, said spheres being concentric, said pole thereby representing both celestial and both terrestrial poles, permanent means in said transparent celestial sphere representing right ascension and declination lines, means for representing star locations thereon, cord means attachable to said pole for representing selected meridians, a member slidable on one cord representing a movable celestial body, a transparent horizon annulus, means for mounting said horizon annulus on said celestial sphere, said annulus mounting means comprising a cord secured to said annulus, said annulus mounting cord cooperating with selected meridian cords to form an astronomical triangle, and a base for supporting said spheres with any point thereon uppermost.

6. A celestial training aid comprising a pole, a terrestrial sphere fixedly mounted on the pole, a transparent celestial sphere rotatably mounted on said pole, said spheres being concentric, said pole thereby representing both celestial and both terrestrial poles, permanent means in said transparent celestial sphere representing right ascension and declination lines, means for representing star locations thereon, cord means attachable to said pole for representing selected meridians, a member slidable to one cord representing a movable celestial body, a transparent horizon annulus, means for mounting said horizon annulus on said celestial sphere, said annulus mounting means comprising a cord secured to said annulus, said annulus mounting cord cooperating with selected meridian cords to form an astronomical triangle, and a base for supporting said spheres with any point thereon uppermost, said base comprising a pair of plane members intersecting at an angle to each other, and a curved recess extending into each plane member about its intersecting point, the radius of each being substantially that of the celestial sphere.

ROSE M. KISSINGER.